United States Patent [19]

Minck et al.

[11] 3,976,503

[45] Aug. 24, 1976

[54] PROCESS FOR RECHARGING SECONDARY BATTERIES

[75] Inventors: Robert W. Minck, Lathrup Village; Neill Weber, Dearborn; Yu-chieh Chang, Taylor, all of Mich.

[73] Assignee: Ford Motor Company, Dearborn, Mich.

[22] Filed: Apr. 14, 1975

[21] Appl. No.: 567,464

[52] U.S. Cl............................. 136/6 FS; 136/83 T
[51] Int. Cl.².......................................... H01M 10/00
[58] Field of Search.................. 136/6 F, 6 FS, 6 R, 136/83 T, 20

[56] References Cited
UNITED STATES PATENTS

| | | | |
|---|---|---|---|
| 3,404,035 | 10/1968 | Kummer et al..................... | 136/6 FS |
| 3,535,163 | 10/1970 | Dzieciuch et al................... | 136/6 FS |

*Primary Examiner*—John H. Mack
*Assistant Examiner*—C. F. LeFevour
*Attorney, Agent, or Firm*—Roger L. May; Keith L. Zerschling

[57] ABSTRACT

An improved process for recharging secondary cells or batteries of the type which in the discharged state comprise:

A. An anodic reaction zone containing a molten alkali metal reactant-anode in electrical contact with an external circuit;
B. A cathodic reaction zone containing (1) cathodic reactants selected from the group consisting of (i) a single phase composition comprising molten polysulfide salts of said anodic reactant and (ii) a two phase composition comprising molten sulfur and molten sulfur saturated polysulfide salts of said anodic reactant and (2) an electrode of porous, electronically conductive material which is at least partially immersed in said cathodic reactants; and
C. A cation-permeable barrier to mass liquid transfer interposed between and in contact with said anodic and cathodic reaction zones, said porous, electronically conductive material being in electrical contact with both said cation-permeable barrier and an external circuit.

The improvement of the invention comprises maintaining a temperature gradient within the cathodic reaction zone during recharging such that the temperature of the cathodic reactants in a first region adjacent said solid electrolyte is sufficiently higher than the temperature of said reactants in a second region not adjacent said solid electrolyte such that sulfur in said first region vaporizes and is transported to said second region where it condenses.

21 Claims, 3 Drawing Figures

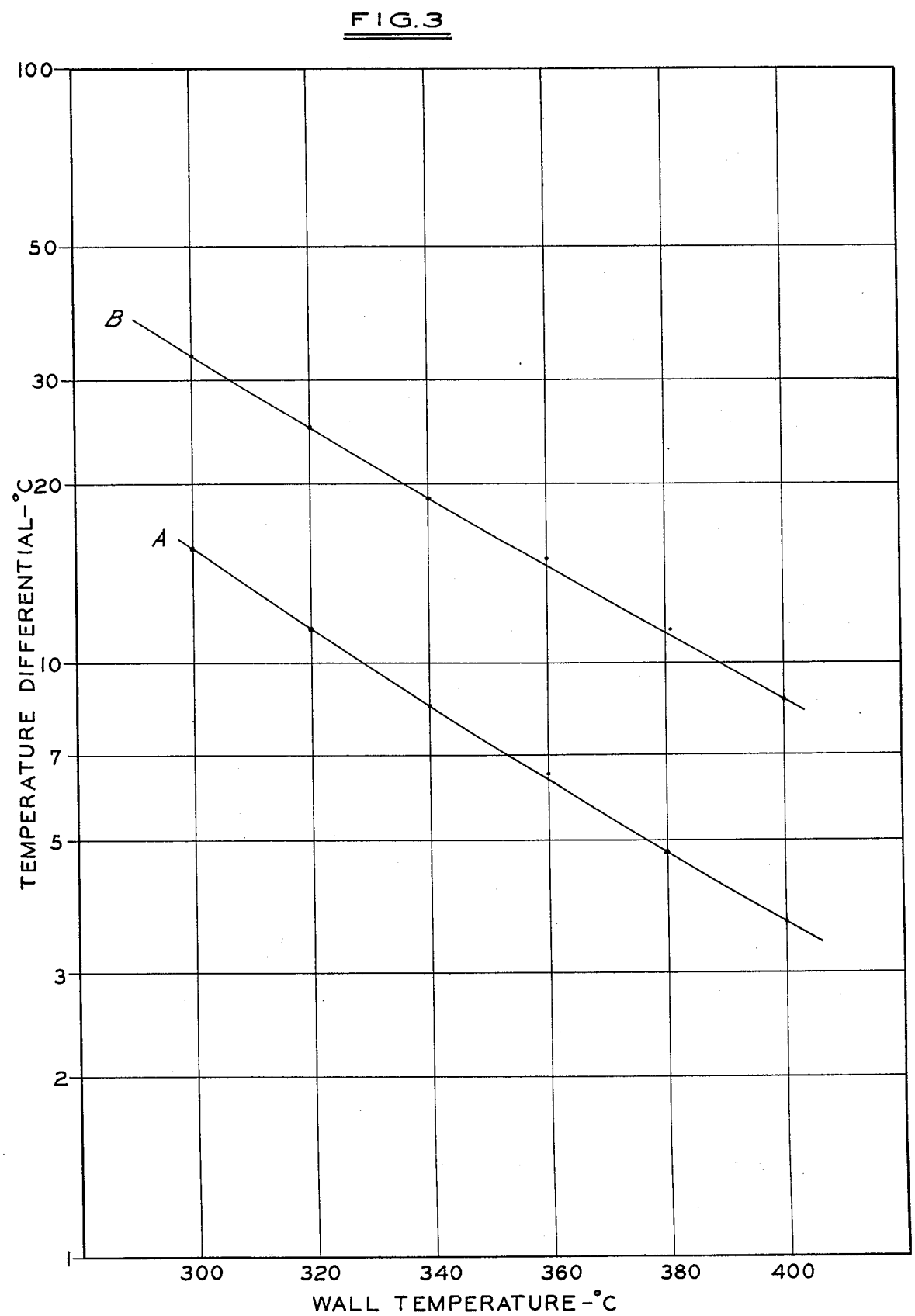

PROCESS FOR RECHARGING SECONDARY BATTERIES

The invention herein described was made in the course of or under a contract or subcontract thereunder with the National Science Foundation.

This application relates to an improved process for recharging secondary cells or batteries.

More particularly, this application relates to a process for recharging secondary cells or batteries comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

This application still more particularly relates to a process for improving ampere-hour capacity of a sodium-sulfur cell or battery by improving vapor transport of sulfur therein during recharging.

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising a liquid electrolyte, e.g., sulfur or a mixture of sulfur and molten polysulfide, which is electrochemically reversibly reactive with said anodic reactant, and (b) a conductive electrode which is at least partially immersed in said cathodic reactant; and (3) a solid electrolyte comprising a cation-permeable barrier to mass liquid transfer interposed between and in contact with said anodic and cathodic reaction zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with sulfide ions. The sulfide ions are formed by charge transfer on the surface of the porous electrode by reaction of the cathodic reactant with electrons conducted through the porous electrode from the external circuit. Because the ionic conductivity of the liquid electrolyte is less than the electronic conductivity of the porous electrode material, it is desirable during discharge that both electrons and sulfur be applied to and distributed along the surface of the porous conductive material in the vicinity of the cation-permeable solid electrolyte. When the sulfur and electrons are so supplied, sulfide ions can be formed near the solid electrolyte so that the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the porous electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the porous electrode, charge transfer is inhibited and the charging process is greatly hindered or terminated. Thus, in order to improve the rechargeability of a cell of this type it is necessary not only to supply polysulfide to the surface of the porous electrode in the vicinity of the cation-permeable membrane, but also to remove sulfur therefrom.

U.S. Pat. No. 3,811,493 and U.S. Patent application Ser. No. 545,048 filed Jan. 29, 1975 both disclose energy conversion device designs which allow or promote improved mass transportation of reactants and reaction products to and from the vicinity of the solid electrolyte and the porous electrode during both discharge and charge. In the device disclosed in the patent an ionically conductive electrolyte is located between a first reactant in one container and a second reactant in another container. An electrode for one of the reactants comprises a layer of porous, electronically conductive material having one surface in contact with one side of the ionically conductive electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which in turn transfers electrons to or from the reactants.

The improvement disclosed in the patent application comprises designing the cathodic reaction zone of the device such that there are a plurality of channels and/or spaces within said zone which are free of porous conductive electrodes and which are thus adapted to allow free flow of the cathodic reactants during operation of the device. This flow results from free connection within the channels and/or spaces, and from wicking of cathodic reactants within the conductive porous material.

Both of these prior art designs are effective in promoting distribution of reactants both during discharge and charge. However, even with these improved designs it is difficult to recharge the cells or batteries at high rates. The invention disclosed herein overcomes such recharging problems and increases the ampere-hour capacity of such recharged devices by promoting vapor transfer of sulfur within the cathodic reaction zone during recharging.

BRIEF DESCRIPTION OF THE INVENTION

The improved process of the invention which achieves these results comprises maintaining a temperature gradient within said cathodic reaction zone such that the temperature of the cathodic reactants in a first region adjacent said solid electrolyte is sufficiently higher than the temperature of said cathodic reactants in a second region not adjacent said solid electrolyte such that sulfur in said first region vaporizes and is transported to said second region wherein it condenses. The improvement of the invention may be employed with any design of cell or battery of the type discussed above and, of course, may be employed with designs of the aforementioned patent and application to further enhance the results achieved thereby.

The invention will be more fully understood after reading the following detailed description thereof in conjunction with the drawings in which:

FIG. 3 is a graph depicting temperature differentials necessary to achieve the desired temperature gradient for two different cells in accordance with the invention.

DETAILED DESCRIPTION OF THE INVENTION

Description of Device

The secondary or rechargeable electrical conversion devices to which the process of this invention applies and various components thereof are disclosed in the following United States patents, the disclosures of which are incorporated herein by reference: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531 and 3,811,493.

As mentioned above, the secondary electrical conversion devices to which the process of this invention applies comprise generally: (1) an anodic reaction zone containing a molten alkali metal reactant-anode in electrical contact with an external circuit; (2) a cathodic reaction zone containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode of porous conductive material which is at least partially immersed in said cathodic reactant and (3) a cation-permeable barrier to mass liquid transfer interposed between and in contact with said anodic and cathodic reaction zones, said porous conductive material being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reaction may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

Figure 2:
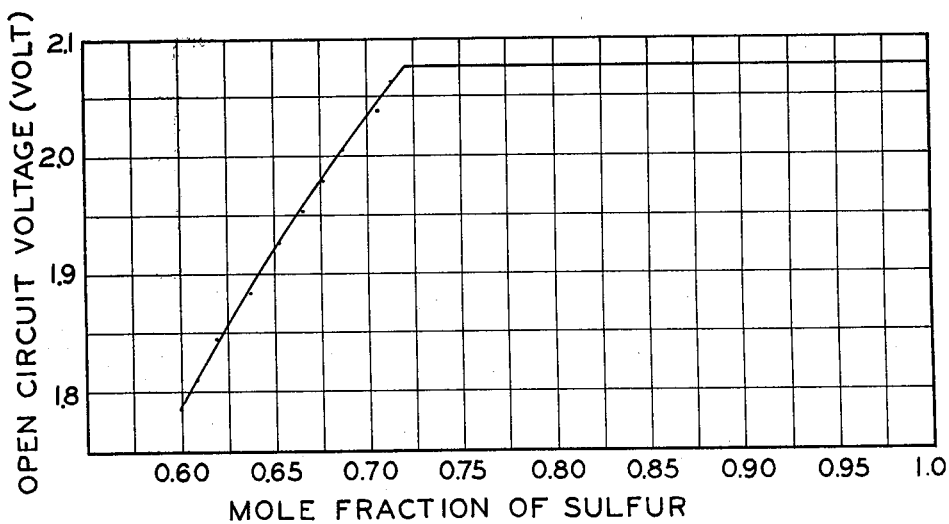
FIG. 2 is a plot of the open circuit voltage for a cell of the type discussed above versus the mole fraction of sulfur in the cathodic reactants.

The cathodic reactant is a molten material which is electrochemically reversibly reactive with the anodic reactant. FIG. 2 plots the relationship between open circuit voltage and the mole fraction of sulfur in the cathodic reactant. The plot is helpful in discussing the composition of the cathodic reactants during charging and discharging. In the theoretically fully charged state the cathodic reactant comprises 100% elemental sulfur. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being esssentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

As the device is charged or discharged, the relative concentrations of sulfur and alkali metal thus vary considerably. This ratio determines the melting point of cathodic reactants and thus must be considered in relation to the operating temperature of the cell and vice versa.

The anodic reactant is separated from the cathodic reactant by a solid barrier to mass liquid transfer that is selectively ionically conductive with respect to cations of the anodic reactant and substantially impermeable to other ions which may be fored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12 mole percent of aluminum oxide and about 34 to about 50 mole percent of silicon dioxide; and (2) about 35 to about 65 preferably about 47 to about 58 mole percent sodium oxide, about 0 to about 30, preferably about 20 to about 30 mole percent of aluminum oxide, and about 20 to about 50, preferably about 20 to about 30, mole percent boron oxide. These glasses may be prepared by conventional glass making procedures using the listed ingredients and firing at temperatures of about 2700°F.

The polycrystalline ceramic materials useful as reaction zone separators or solid electrolytes are bi- or multi-metal oxides. Among the polycrystalline bi- or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials useful as reaction zone separators or solid electrolyte are the following:

1. Standard Beta-type-alumina which exhibits the above-discussed crystalline structure comprising a series of layers of aluminum oxide held apart by layers of linear Al-O bond chains with sodium occupying sites between the aforementioned layers and columns. Beta-type-alumina is formed from compositions comprising at least about 80% by weight, preferably at least about 85% by weight of aluminum oxide and between about 5 and about 15 weight percent, preferably between about 8 and about 11 weight percent, or sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O.11Al_2O_3$. The second crystalline is $\beta''$-alumina which may be represented by the formula $Na_2O.6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode or porous conductive material is in electrical contact, and preferably in physical contact, with both the cation-permeable barrier or solid electrolyte and the container in which the electrical conversion device is housed. The conductive material is of significantly greater surface area than a solid cathode and may comprise any porous material which is electronically conductive and which is resistant to attack by reactants within the cathodic reaction zone. Among the materials which may be employed are felts or foams of graphite or vitreous carbons.

While the secondary cells or batteries to which the process of this invention is applicable may have a number of different configurations, several of which are disclosed in the above-incorporated patents, a preferred configuration which is particularly suitable for recharging in accordance with the process of the invention comprises: (1) a tubular container which is in electrical contact with an external electrical circuit; (2) a tubular cation-permeable barrier to mass liquid transfer which is disposed within said tubular container so as to create an anodic reaction zone within said tubular barrier and a cathodic reaction zone between said tubular barrier and said tubular container; (3) a molten alkali metal anodic reactant within said anodic reaction zone in electrical contact with said external electrical circuit; (4) a cathodic reactant comprising a liquid electrolyte which is electrochemically reversibly reactive with said anodic reactant and which in the discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode of porous conductive material which is disposed within said cathodic reaction zone, immersed at least in part in a cathodic reactant and is in both electrical and physical contact with both the tubular barrier and the tubular container. Such tubular or cylindrical secondary cells thus comprise cathodic reaction zones which completely surround the solid electrolyte or reaction zone separator.

Recharging Process of the Invention

The above-discussed secondary cells or batteries are conventionally recharged in the same manner as are other secondary or rechargeable batteries, i.e., by application of a negative potential to the anode of the device. As discussed previously, during the charge cycle an electrochemical reaction which is the opposite of that occurring during discharge occurs. Thus, electrons are removed from the alkali metal polysulfide by charge transfer at the surface of the porous electrode and are conducted through the electrode material to the external circuit. The alkali metal cation is conducted through the liquid electrolyte and solid electrolyte to the anode where it accepts an electron from the external circuit.

Further reference to FIG. 2, which plots the relationship between open circuit voltage and the mole fraction of sulfur in the cathodic reactant of the device, will be helpful in the following discussion of the electrochemical reactions occurring within the cell during charging. In the fully discharged state the molar ratio of sulfur to alkali metal in the polysulfide melt is about 3:2. Since in this state the polysulfide melt is single phase in nature, the activity of sulfur in the melt is substantially less than unity when the mole fraction of sulfur is about 0.60 and approaches unity as the mole fraction approaches 0.72 the point at which the polysulfide is sulfur saturated. As the cell is recharged, elemental sulfur is formed momentarily on the surfaces of the porous electrode in the vicinity of the solid ceramic electrolyte. Since sulfur is nonconductive, the presence of elemental sulfur on the porous electrode could cause difficulty in continuing the recharging process. However, when the mole fraction of sulfur in the melt is between about 0.60 and about 0.72, i.e., the single phase region, the sulfur which forms on the surface of the porous electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point in the plot of FIG. 2 where the mole fraction of sulfur is approximately 0.72 and the open circuit voltage becomes constant.

As charging of the cell or battery continues, the sulfur saturated polysulfide will no longer react with elemental sulfur deposited on the porous electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on porous electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The improved process of this invention serves to overcome the difficulty which is caused by formation of elemental sulfur on the porous electrode surface near the solid ceramic electrolyte. The invention comprises, maintaining a temperature gradient within the cathodic reaction zone during the recharging cycle such that the temperature of the cathodic reactants in the region adjacent the solid electrolyte is sufficiently higher than the temperature of the cathodic reactants in a second region spaced away from the solid electrolyte such that the elemental sulfur in the first region is vaporized and transported to the second region where it condenses. By maintaining this temperature gradient a flow of reactants within the cathodic reaction zone is created, thus moving the insulating elemental sulfur away from the region adjacent the electrolyte and allowing the unreacted polysulfide salts to move into the vicinity of the solid electrolyte so that the recharging reaction can continue. Obviously the improvement of the process has its maximum advantage in that portion of the recharging cycle where two phases, one of sulfur and one of sulfur saturated polysulfide salts are formed inasmuch as the elemental sulfur tends to accumulate in large amounts and cannot react further with any polysulfide. However, the invention also has advantage in the single phase region of the recharging cycle since it will assist in more rapidly removing elemental sulfur which has deposited near the ceramic electrolyte and on the porous electrode. Thus, in this single phase condition, the temperature gradient should not only assist in transporting the sulfur from the region close to the solid ceramic electrolyte but also should assist in distributing the elemental sulfur so that it can react more quickly with polysulfide salts in the immediate vicinity thereof.

Various methods for obtaining the necessary temperature difference within the cell between the first region close to the solid ceramic electrolyte and the second region where it is desired to have the vaporized sulfur condensed will be apparent to those skilled in the art. However, some of the possible methods for obtaining this suitable temperature difference or gradient within the cell include: (1) making use of internal losses associated with cell operations; (2) increasing normal cell losses by charging the cell with an electrical current which consists of a large alternating current component in addition to the DC current component; (3) adding heat to the alkali metal anode reactant by flowing hot fluid through pipes placed in the alkali metal reactant; (4) adding heat to the alkali metal anode by Joule heating developed in an electrical heater inserted into the alkali metal, but electrically insulated therefrom; (5) reducing the amount of heat extracted from reactive cell volume by conduction along the column of alkali metal and subsequent heat transfer of heat through the walls of sodium container by varying cell design such as by (a) increasing the length to cross-sectional area ratio of the alkali metal column or by (b) thermally insulating the alkali metal reservoir from the outside environment; and combinations of the above.

Figure 1:
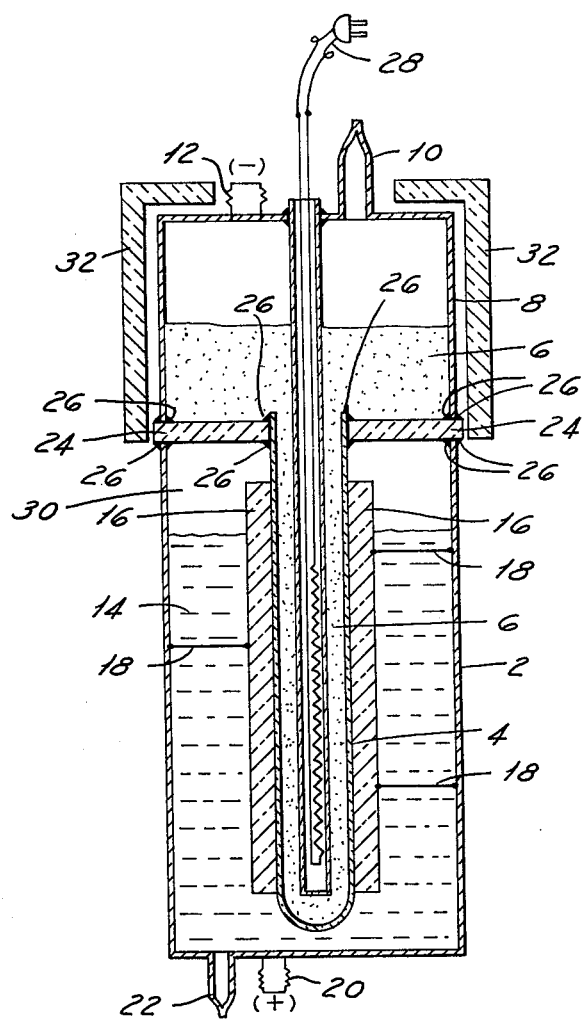
FIG. 1 shows a vertical sectional view of a cell which is adapted to be recharged in accordance with the process of the invention.

FIG. 1 shows a vertical cross-sectional schematic view of a secondary or rechargeable cell adapted to be recharged using the improvement of the invention. The cell shown is of the tubular configuration discussed above comprising a tubular cathode container 2 such as coated stainless steel and a tubular cationically conductive ceramic 4 disposed therewithin. Liquid sodium 6, the anodic reactant, is shown within tube 4. This liquid sodium is supplied to the anodic reaction zone from a sodium reservoir 8 formed from a suitable material such as stainless steel. A sealable fill spout for inserting sodium into the reservoir is shown at 10. Negative terminal 12 is connected by a lead not shown to an external circuit. Cathodic reactants 14 comprising liquid sulfur and sodium polysulfide are contained in the cathodic reaction zone formed between the tubular container 2 and the tubular solid electrolyte 4. A porous electrode 16 is disposed within the cathodic reaction zone and at least partially immersed in the cathodic reactant 14. Electronic conductors 18 connect this porous electrode 16 to the conductive container 2. This completes the circuit from the porous electrode to the container which in turn is connected through positive terminal 20 to the external circuit. Sealable fill spout 22 may be used to fill the cathodic reaction zone with sulfur. The cathodic reaction zone containing cathodic reactant 14 is sealed from the anodic reaction zone and the sodium reservoir 8 by insulating material 24 such as alpha-alumina. The insulating member is maintained in sealed relationship with container 2 and solid electrolyte 4 by seals 26. Electric heater 28 connected to a separated power source is disposed within the anodic reaction zone. This heater is employed to heat the sodium in the anodic reaction zone to a greater temperature than the temperature of the reactants in the cathodic reaction zone. The heat is then transferred through the solid electrolyte 4 to the cathodic reactants sulfur and sodium polysulfide in the vicinity surrounding the solid electrolyte 4. This transfer of heat causes that portion of the cathodic reactant in close proximity to the tubular solid ceramic to be heated to a temperature greater than those portions of the cathodic reactant which are further removed from the solid electrolyte. This creates the temperature gradient discussed above within the cathodic reaction zone. The amount of heat applied to the anodic chamber through the heater 28 must be sufficient to allow enough heat to transfer to the cathodic reaction zone so as to vaporize sulfur in the area immediately adjacent the solid electrolyte 4, particularly within the region in which the porous electrode is immersed. In essence, the temperature must be high enough to cause the sulfur to boil off in the region adjacent the solid electrolyte. In this connection it should be noted that residual gases and sulfur vapor will be present in the region 30 above the cathodic reactants 14 in the cathodic reaction zone. The pressure of the residual gases 30 should desirably be kept low so as to not inhibit vaporization of the sulfur from the cathodic reactant 14. The residual pressure is preferably lower than the vapor pressure of sulfur at the operating temperature of the cell and most preferably less than about 1/10 the vapor pressure of sulfur at the operating temperature.

Insulative material 32 shown disposed about sodium reservoir 8 may be employed to reduce heat loss from the sodium and thereby contribute to the production of the desired temperature gradient. Such insulating material may be employed either with or without additional heating means.

The following specific examples are merely representative of the numerous possible applications of the improved process of the invention and are not intended to be limiting.

EXAMPLE 1

A sodium-sulfur cell similar to that shown in the schematic drawing employing a tubular sodium ion conductive ceramic such as Beta-alumina type ceramic having approximate dimensions of 20 cm. in length, 1 cm. in outer diameter and 0.8 cm. in inner diameter is constructed. The ion conductive ceramic tube is insulatingly sealed by a borosilicate glass to an alpha-alumina member which electrically separates the negative from the positive pole of the cell. The container for the sodium reservoir is fabricated to proper size from a metal or alloy resistant to corrosive attack by sodium at 400°C (e.g., nickel, stainless steel) and hermetically sealed to the alpha-alumina by active metal braze. The compartment is then filled with the appropriate quantity of sodium and a small pressure of inert gas is introduced through the fill spout which is then sealed. The container for the cathodic reaction zone or compartment consists of a metal material coated on its interior with an electronically conductive film, the material having adequate resistance to corrosion by sulfur and sodium polysulfide, being sealed hermetically to the alpha-alumina insulator and making electronic contact to one of the shaped porous electrode structures disclosed in U.S. Patent application Ser. No. 545,048. The approximate dimensions of the container are 21 cm in length, 3 cm in inside diameter and 1 mm in wall thickness. The cathodic reaction zone is filled with appropriate amounts of sulfur, evacuated to a pressure of less than 1 Torr and sealed. To allow for the about 30 percent expansion in catholyte volume which occurs when the cell is discharged to $Na_2S_3$, the sulfur is initially filled to a depth of about 14 cm. The length of the gas phase region varies from about 6 cm. to about 2 cm as the cell goes from a fully charged to a fully discharged condition. For this example, no additional heat is supplied to the sodium so that the electric heater and heater well shown in FIG. 1 are not employed. The temperature gradient will be induced by the internal cell losses during operation. The temperature of the sulfur or sulfur-saturated sodium polysulfide that is necessary to promote boiling in the vicinity of the ceramic can be estimated by calculating the local total pressure in the liquid. The total pressure is the sum of the pressure at the gas-liquid interface plus the hydrostatic pressure due to the weight of the cathodic reactant which pressure varies with depth below the gas-liquid interface. In this example, since the pressure of residual gases is substantially lower than the vapor pressure of sulfur at the operating temperatures, a situation analogous to a heat pipe occurs, wherein sulfur is vaporized from a hot zone and condensed on the cold surfaces. There is negligible pressure drop in the vapor phase because the vapor flow is unimpeded so that the pressure everywhere in the vapor phase is nearly that corresponding to the vapor pressure at the temperature of the condensed sulfur film on the inside of the container wall. Usually the film temperature is close to the temperature of the wall. The maximum hydrostatic pressure occurs at the bottom of the cell and has a value $P = pgh$ where $p$ and $h$ are the density and height of the liquid and $g$ is the gravitational constant. For this example $p$ is less than 1.9 g/cc and $h_{max}$ equal about 16 cm. Therefore, $P$ is less than 23 Torr. The temperature differential between the sulfur near the ceramic and that near the container which is necessary to provide the 23 Torr pressure difference for boiling at the bottom of the cell is plotted in FIG. 3, curve A, as a function of wall temperature. At 350°C the heat flux required to maintain a 7° differential temperature is about 0.04 watt/cm² of ceramic, based on an estimated thermal conductivity ($K = 0.005$ w/°cm) of stagnant polysulfide. At a charging current density of 150 mA/cm² of ceramic, a voltage drop within the cell of about 0.25 volts is sufficient to develop the estimated heat requirement. To supply the heat of vaporization, an additional equivalent voltage drop of about 0.25 volts is required. The 0.5 volt voltage loss is a reasonable value and can be expected from most applications.

EXAMPLE 2

A sodium-sulfur cell larger, but similar to that described in Example 1 and having a ceramic tube with approximate dimensions of 50 cm in length, 1.5 cm in outside diameter and 1.3 cm in inside diameter is prepared. The approximate dimensions of the cathode container are 51 cm. in length, 5 cm. in outside diameter and 1 mm. in wall thickness. The sodium container is correspondingly sized to hold the required quantity of reagent. The pressure differential required for boiling at the bottom of the larger cell is about 56 Torr. The corresponding temperature differential is plotted versus container temperature in FIG. 3, curve B. At 350°C an estimate of the heat flux through the stagnant polysulfide to maintain the required 17°C differential across 1.65 cm. distance is 0.06 watt/cm² of ceramic area. At a charging density of 150 mA/cm² of ceramic area, a voltage loss of about 0.4 is needed to maintain the 17°C differential in addition to the 0.25 v loss required to supply the heat of vaporization.

If the voltage loss within the cell is less than 0.65 v and if no additional heat is supplied, then the temperature differential will be less than is required under the maximum hydrostatic pressure, i.e., boiling will not occur in the lower position of the cell. It will be appreciated, however, that such a lower temperature differential will still achieve the beneficial results desired by causing at least some mass transfer of sulfur.

It will be obvious to those skilled in the art that the process of the invention as specifically described may be varied without departing from the scope of the invention as set forth in the following appended claims.

We claim:

1. A process for recharging a secondary cell or battery, which in an at least partially discharged state comprises
   A. One or more anodic reaction zones containing a molten alkali metal reactant-anode in electrical contact with an external circuit,
   B. One or more cathodic reaction zones containing
      1. cathodic reactants selected from the group consisting of (i) a single phase composition comprising molten polysulfide salts of said alkali metal and (ii) a two phase composition comprising molten sulfur and molten sulfur saturated polysulfide salts of said alkali metal and
      2. an electrode of porous conductive material which is at least partially immersed in said cathodic reactants,
      the residual vapor pressure within said cathodic reaction zone being lower than the vapor pressure of sulfur at the operating temperature of said cell or battery, and
   C. A cation-permeable solid electrolyte barrier to mass liquid transfer interposed between and in contact with said anodic and cathodic reaction zones, said porous conductive material being in electrical contact with both said solid electrolyte and an external circuit,
comprising applying a negative potential to the anode of said cell or battery while maintaining a temperature gradient within said cathodic reaction zone such that the temperature of said cathodic reactants in a first region adjacent to said solid electrolyte is sufficiently higher than the temperature of said cathodic reactants in a second region not adjacent to said solid electrolyte such that elemental sulfur in said first region vaporizes and is transported to said second region where it condenses.

2. A process in accordance with claim 1 wherein said cathodic reactants are selected from the group consisting of (i) a single phase composition comprising molten polysulfide salts of said anodic reactant in which the molar ratio of sulfur to anodic reactant is greater than or equal to about 3:2, but less than about 5.2:2 and (ii) a two phase composition comprising sulfur and molten sulfur saturated polysulfide salts of said anodic reactant in which the molar ratio of sulfur to anodic reactant is about 5.2:2.

3. A process in accordance with claim 1 wherein the residual vapor pressure in said cathodic reaction zone is less than about one-tenth the vapor pressure of sulfur at the operating temperature of said cell or battery.

4. A process in accordance with claim 2 wherein said alkali metal is sodium.

5. A process in accordance with claim 2 wherein said alkali metal is sodium and said cathodic reactant is a two phase composition comprising molten sulfur and molten sulfur saturated sodium polysulfide in which the molar ratio of sulfur to sodium is about 5.2:2.

6. A process for recharging a secondary cell or battery, which in an at least partially discharged state comprises
   A. A tubular container which is in electrical contact with an external electrical circuit,
   B. A tubular cation-permeable solid electrolyte barrier to mass liquid transfer which is disposed within said tubular container so as to create an anodic reaction zone within said tubular barrier and a cathodic reaction zone between said tubular barrier and said tubular container, the residual vapor pressure within said cathodic reaction zone being lower than the vapor pressure of sulfur at the operating temperature of said cell or battery,
   C. A molten alkali metal anodic reactant within said anodic reaction zone in electrical contact with said external electrical circuit,
   D. Cathodic reactants within said cathodic reaction zone selected from the group consisting of (1) a single phase composition comprising molten polysulfide salts of said anodic reactant and (2) a two phase composition comprising molten sulfur and molten polysulfide salts of said anodic reactant, and
   E. An electrode of porous conductive material which is disposed within said cathodic reaction zone and immersed at least in part in said cathodic reactants and is in both electrical and physical contact with both said tubular barrier and said container,
comprising applying a negative potential to the anode of said cell or battery while maintaining a temperature gradient within said cathodic reaction zone such that the temperature of said cathodic reactants in a first region adjacent said tubular barrier is sufficiently higher than the temperature of said cathodic reactants in a second region adjacent said tubular container such that sulfur in said first region vaporizes and is transported to said second region where it condenses.

7. A process in accordance with claim 6 wherein said cathodic reactants are selected from the group consisting of (1) a single phase composition comprising molten polysulfide salts of said anodic reactant in which the molar ratio of sulfur to anodic reactant is greater than or equal to about 3:2, but less than about 5.2:2 and (2) a two phase composition comprising sulfur and molten sulfur saturated polysulfide salts of said anodic reactant in which the molar ratio of sulfur to anodic reactant is about 5.2:2.

8. A process in accordance with claim 6 wherein said temperature gradient is maintained by reducing the amount of heat extracted from said cell or battery during operation.

9. A process in accordance with claim 6 wherein said temperature gradient is maintained by increasing normal cell losses by charging the cell or battery with an electrical current which consists of a large alternating current component in addition to the direct current component thereof.

10. A process in accordance with claim 7 wherein said anodic reactant is sodium.

11. A process in accordance with claim 7 wherein said anodic reactant is sodium and said cathodic reactants comprise sulfur saturated sodium polysulfide salts in which the molar ratio of sulfur to sodium is about 5.2:2.

12. A process in accordance with claim 8 wherein the residual vapor pressure in said cathodic reaction zone is less than about one-tenth the vapor pressure of sulfur at the operating temperature of said cell or battery.

13. A process in accordance with claim 8 wherein said temperature gradient is maintained by applying external heat to said cathodic reaction products and said first region, but not in said second region.

14. A process in accordance with claim 13 wherein said anodic reaction zone is insulated so as to reduce heat loss through said reaction zone during charging, thereby maintaining an elevated temperature in the region of said cathodic reaction zone adjacent said anodic reaction zone.

15. A process in accordance with claim 13 wherein said external heat is applied to said cathodic reactant in said first region by a heating element which is disposed in said anodic reaction zone.

16. A process in accordance with claim 15 wherein said heating element comprises an electrical heater which is electrically insulated from the anodic reactant.

17. A process in accordance with claim 15 wherein said heating element comprises a tube through which hot fluids are passed.

18. A process in accordance with claim 8 wherein said temperature gradient is maintained by increasing the length to cross-sectional area ratio of the anodic reaction zone.

19. A process in accordance with claim 8 wherein said temperature gradient is maintained by thermally insulating said anodic reaction zone and the alkali metal reservoir which supplies that reaction zone.

20. A process in accordance with claim 9 wherein said anodic reaction zone is insulated so as to reduce heat loss through said reaction zone.

21. A process in accordance with claim 9 wherein said anodic reactant is supplied to said anodic reaction zone from a reservoir which is thermally insulated.

* * * * *